Nov. 1, 1927.  
O. C. REEVES  
INDICATOR  
Filed Jan. 28, 1925  
1,647,306
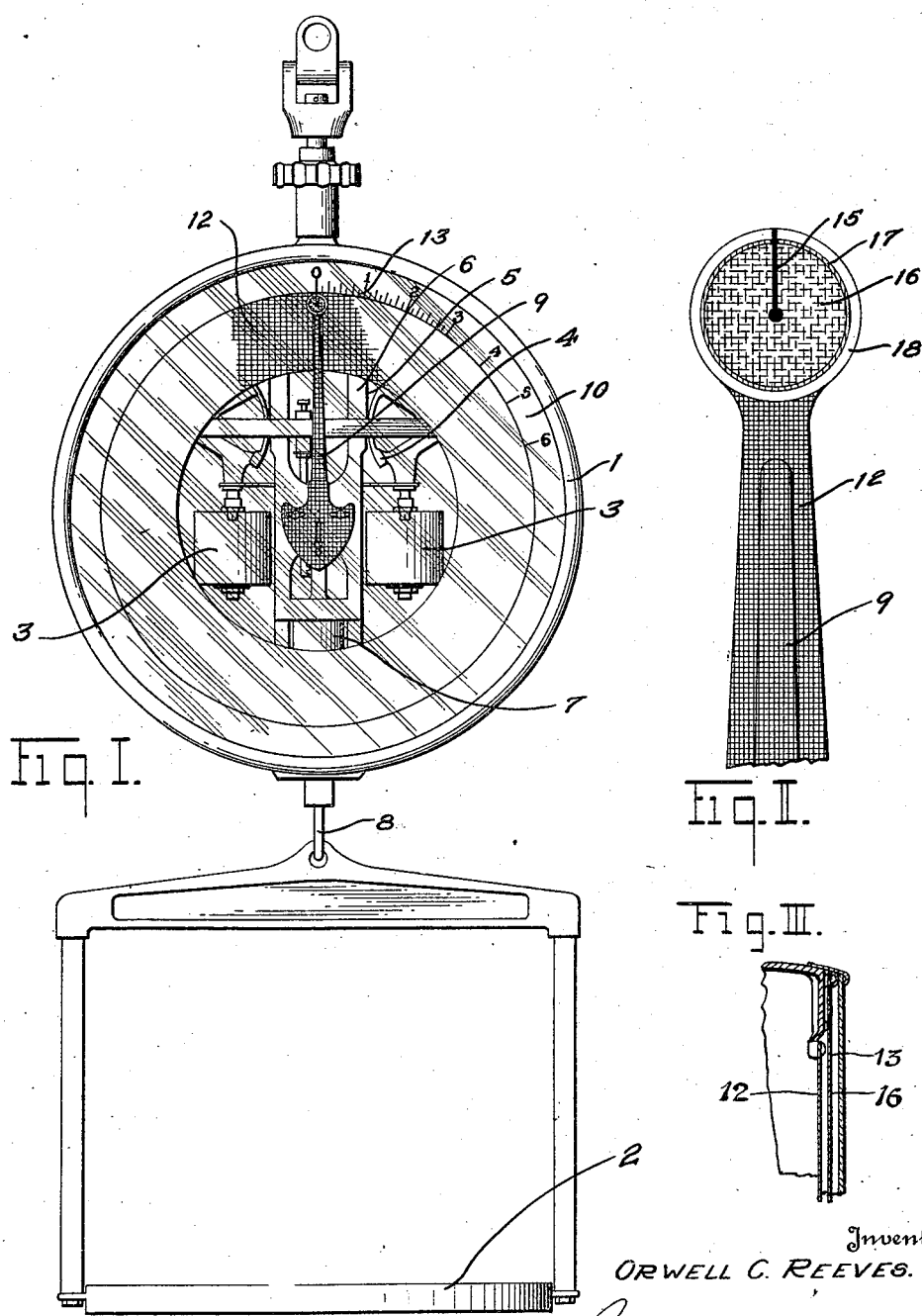
Fig. I.  
Fig. II.  
Fig. III.  
Inventor  
ORWELL C. REEVES.  
By Ed. Marshall  
Attorney Patented Nov. 1, 1927.

1,647,306

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

INDICATOR.

Application filed January 28, 1925. Serial No. 5,353.

This invention relates to indicators, and more particularly to indicating devices for weighing scales, and one of its principal objects is to provide an indicator in the use of which errors due to parallax which occur because of changes in the reader's position are avoided.

Another object is the provision of a chart and indicator hand co-operating therewith, the parts being so constructed and arranged as to facilitate the reading of indications thereon.

Another object is the provision of an indicator for scales which is constructed and colored in a manner to quickly catch the eye of the operator.

Another object is the provision of an indicator and chart for weighing scales, the color of the background for the indicator being similar to that of the major portion of said indicator, the indicating portion being prominently colored to present a striking appearance for the purpose of attracting the eye of the observer.

Another object is the provision of an indicator for scales, the color of the indicating portion being dissimilar from that of the chart to prevent errors in reading the weight indications.

Still another object is the provision of a simple and effective means for indicating the weight which is rendered visible at a comparatively great distance from the scale.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale embodying my invention.

Figure II is an enlarged fragmentary elevational view of a portion of the indicating hand.

Figure III is a fragmentary sectional view showing the chart and indicator hand lying in the same plane with a sheet of material forming the background for the indicator hand.

Referring to the drawings in detail, I have illustrated the device of my invention as embodied in a weighing scale of the hanging type, but it is to be understood that this device may be incorporated in any mechanism where it is found to be applicable. The weighing scale per se forms no part of the present invention and will only be described in such detail as to show the use of my device therewith. The scale is of the hanging type and comprises a watch-case-shaped housing 1 which supports and houses the load-counterbalancing mechanism from which is suspended a commodity receiving pan 2. The load-counterbalancing mechanism consists of a pair of pendulums 3, each pendulum being provided with a fulcrum sector 4 suspended by means of a flexible metallic ribbon 5 from an upright frame 6. The pendulums are also provided with power sectors (not shown) which are connected by flexible ribbons (not shown) to a member 7 from which depends a link 8 supporting the pan 2. It will be apparent that a load placed upon the commodity receiving pan exerts a downward force upon the link 8 and associated mechanism, causing the pendulums 3 to swing upwardly and outwardly to counterbalance the load upon the pan 2 and an indicator hand 9 adapted to co-operate with a chart 10 to be rotated by means of rack and pinion mechanism (not shown) to a position indicating the weight of the article or commodity. The load-counterbalancing mechanism hereinbefore briefly described is generally the same as that described and claimed in the patent to Hapgood No. 1,203,611, dated November 7, 1916.

In the operation of an automatic scale it becomes a very difficult matter to cause the indicator to come to rest in a weight indicating position. The oscillation of the indicator tends to continue, particularly if the scale proper is subject to vibration from external forces, making it very difficult to obtain an indication of the weight. In order to overcome the difficulty of locating the exact position of the indicating hand, I have provided a hand, the major portion of which may be inconspicuously colored—for example, black. I have also provided a background 12 which may also be inconspicuously colored, so that the major portion of the hand will not be strikingly visible to the eye, as the color of the hand blends with that of the background so that movement of the body of the hand will be scarcely noticed.

The tip or indicating portion of the hand—i. e., the part thereof in juxtaposition to the chart 13 is suitably provided with an index 15 and a conspicuously colored portion 16, preferably orange or yellow, which may be circumscribed by one or more colored bands 17 and 18, which are preferably colored red and white respectively. It has been found by experiment that this combination of colors when placed upon the index end or extremity of the indicator hand appear as a target and the eye of the observer will be instantly attracted to it, and as the indicator moves to indicating position the eye can easily follow it without undue strain. The index 15 may be of any color. However, a black line has been found to be the most efficient, and this is especially true when used in the combination of colors hereinbefore mentioned.

It will be apparent from the foregoing that the indicating portion of the hand, being of brilliant colors, is rendered extremely conspicuous during its movement to weight indicating position over a dull or inconspicuously colored background.

The embodiment of my invention herein shown and described is to be regarded as illustrative only, and it is to be understood that the invention is susceptible to variation.

Having described my invention, I claim:

1. In a device of the class described, in combination, a substantially annular chart, an indicating hand having an index co-operating therewith, and a sheet of material forming a background for a portion of the indicating hand and being optically similar to the major portion thereof, a substantially circular portion of said indicator hand in juxtaposition to said index being optically dissimilar to the major part of said indicating hand and the chart.

2. In a device of the class described, in combination, a chart, an indicating hand adapted to move in the plane of said chart, a background for said hand and being optically similar to the major part of said hand, a portion of said hand in juxtaposition to said chart being colored to present striking contrast against said background.

3. In a device of the class described, in combination, a chart having an interior section in one plane and an exterior section in another plane, an indicator hand lying before the interior section and substantially in the plane of the exterior section, the major portion of the hand and the interior section of the chart being of substantially the same color, the exterior section of the chart being of a different color, and the tip of the hand adjacent the exterior section of the chart being of still another color.

4. In a device of the class described, in combination, a chart having an interior section in one plane and an exterior section in another plane, an indicator hand lying before the interior section and substantially in the plane of the exterior section, the major portion of the hand and the interior section of the chart being of substantially the same color, the exterior section of the chart being of a different color, and the tip of the hand adjacent the exterior section of the chart being of still another color, said chart having graduation marks and said tip having an index adapted to co-operate therewith.

5. In a device of the class described, in combination, a chart, and an indicating hand co-operating therewith having a tip substantially circular in shape conspicuously colored, said tip bearing a radial line forming an index and co-operating with graduations on said chart.

6. In a device of the class described, in combination, an annular chart, and an indicator hand co-operating therewith, said indicator hand having a substantially circular tip conspicuously colored, said tip bearing a radial line constituting an index, the surface of said tip and the surface of said chart lying in substantially the same plane, the index co-operating with graduations upon said chart.

7. In a device of the class described, in combination, an annular chart, an indicator hand co-operating therewith, said indicator hand having a substantially circular tip conspicuously colored, said tip bearing a radial line constituting an index, the surface of said tip and the surface of said chart lying in substantially the same plane, the index co-operating with graduations upon said chart, the body of the indicator hand being inconspicuously colored, and a sheet of material of light inconspicuous color underlying said hand.

ORWELL C. REEVES.